(12) United States Patent
Anderson et al.

(10) Patent No.: US 8,146,388 B2
(45) Date of Patent: Apr. 3, 2012

(54) LOW FRICTION EDGE ROLL TO MINIMIZE FORCE CYCLING

(75) Inventors: James G. Anderson, Dundee, NY (US); L. Kirk Klingensmith, Corning, NY (US); James P. Peris, Horseheads, NY (US); David J. Ulrich, Burdett, NY (US)

(73) Assignee: Corning Incorporated, Corning, NY (US)

( * ) Notice: Subject to any disclaimer, the term of this patent is extended or adjusted under 35 U.S.C. 154(b) by 378 days.

(21) Appl. No.: 12/608,036

(22) Filed: Oct. 29, 2009

(65) Prior Publication Data

US 2011/0100056 A1    May 5, 2011

(51) Int. Cl.
*C03B 15/02*    (2006.01)
(52) U.S. Cl. .................. 65/205; 65/202; 65/199; 65/91
(58) Field of Classification Search ............... 65/91, 92, 65/97, 125, 126, 129, 193, 196, 198, 199, 65/200, 201, 202, 203, 204, 205, 324, 325, 65/336; 277/358, 361, 364, 365, 366, 367, 277/500, 503, 505
See application file for complete search history.

(56) References Cited

U.S. PATENT DOCUMENTS

| | | | |
|---|---|---|---|
| 1,586,618 A | | 6/1926 | Ferngren |
| 2,829,931 A * | | 4/1958 | De Pree et al. ............... 384/149 |
| 3,338,696 A | | 8/1967 | Dockerty ........................ 65/145 |
| 3,419,374 A * | | 12/1968 | Offenbacher et al. .......... 65/160 |
| 3,563,719 A * | | 2/1971 | Sleighter et al. ................. 65/95 |
| 3,682,609 A | | 8/1972 | Dockerty ........................ 65/83 |
| 3,773,486 A * | | 11/1973 | Toussaint et al. ............ 65/29.17 |
| 4,612,030 A | | 9/1986 | Smids ................................ 65/91 |
| 5,207,794 A * | | 5/1993 | Erdal ............................ 277/346 |
| 6,502,423 B1 * | | 1/2003 | Ostendarp et al. ........... 65/29.14 |
| 6,616,025 B1 | | 9/2003 | Andrewlavage, Jr. ....... 225/96.5 |
| 6,758,064 B1 * | | 7/2004 | Kariya .............................. 65/91 |
| 2003/0106340 A1 * | | 6/2003 | Nitschke et al. ................ 65/104 |
| 2005/0268655 A1 * | | 12/2005 | Butts et al. .................... 65/29.12 |
| 2006/0042314 A1 | | 3/2006 | Abbott, III et al. ............ 65/25.3 |
| 2009/0107182 A1 | | 4/2009 | Anderson et al. ................. 65/90 |
| 2009/0217708 A1 * | | 9/2009 | DeAngelis et al. .......... 65/134.2 |

FOREIGN PATENT DOCUMENTS

JP         05-124826         5/1993

(Continued)

OTHER PUBLICATIONS

JP 05124826 (Machine Translation) [online], [retrieved on Dec. 12, 2011], retrieved from PAJ Database (http://www19.ipdl.inpit.go.jp/PA1/cgi-bin/PA1INDEX).*
JP 05124827 (Machine Translation) [online], [retrieved on Dec. 12, 2011], retrieved from PAJ Database (http://www19.ipdl.inpit.go.jp/PA1/cgi-bin/PA1INDEX).*
JP 05193964 (Machine Translation) [online], [retrieved on Dec. 12, 2011], retrieved from PAJ Database (http://www19.ipdl.inpit.go.jp/PA1/cgi-bin/PA1INDEX).*

(Continued)

*Primary Examiner* — Matthew Daniels
*Assistant Examiner* — Yana Belyaev
(74) *Attorney, Agent, or Firm* — Kevin M. Able

(57) ABSTRACT

An apparatus for drawing a glass ribbon including a shroud surrounding the glass ribbon and an edge roll that penetrates the shroud to contact the glass ribbon. The apparatus includes regulating a pressure within the seal assembly to be equal to or less than a pressure within the shroud and prevent ingress of relatively cooler outside gas into the hot interior of the shroud. The edge roll utilizes an air bearing to minimize friction that can produce periodic fluctuation of the ribbon as the edge roll is displaces in response to variations in the ribbon thickness or equipment dimensions.

13 Claims, 4 Drawing Sheets

FOREIGN PATENT DOCUMENTS

| | | | |
|---|---|---|---|
| JP | 05-124827 | | 5/1993 |
| JP | 05124826 A | * | 5/1993 |
| JP | 05124827 A | * | 5/1993 |
| JP | 05193964 A | * | 8/1993 |
| JP | 10-291826 | | 11/1998 |
| JP | 2007-051028 | | 3/2007 |
| JP | 2009149463 A | * | 7/2009 |
| SU | 243165 | * | 9/1969 |

OTHER PUBLICATIONS

JP 2009149463 (Machine Translation) [online], [retrieved on Dec. 12, 2011], retrieved from PAJ Database (http://www19.ipdl.inpit.go.jp/PA1/cgi-bin/PA1INDEX).*

SU 243165 (Machine Translation) [online], [retrieved on Dec. 12, 2011], retrieved from Derwent Database.*

* cited by examiner

LOW FRICTION EDGE ROLL TO MINIMIZE FORCE CYCLING

TECHNICAL FIELD

This invention is directed to a method of reducing force cycling in a glass drawing process. An apparatus for drawing glass that reduces force cycling is also disclosed.

BACKGROUND

One method of forming a thin sheet of glass is by a drawing process where a ribbon of glass is drawn from a reservoir of molten glass. This may be accomplished, for example, via an up-draw process, where the ribbon is drawn upward from the reservoir (e.g. Foucault or Colburn), or by a down-draw process (e.g. slot or fusion), where the ribbon is drawn downward, typically from a forming body. Once the ribbon is formed, individual sheets of glass are cut from the ribbon.

In a conventional downdraw process, the molten glass is formed into a glass ribbon contained within a draw chamber defined by a shroud that surrounds the ribbon. Among other things the shroud serves to maintain a consistent thermal environment in the region defined by the shroud and surrounding the ribbon. Roller pairs penetrate the shroud and pinch the ribbon edges. The rollers may be used to apply a pulling force to the ribbon, to apply a transverse tension to the ribbon, or merely to guide the ribbon. Accordingly, a rotational force may be applied to the rollers by a motor, or the rollers may be free-wheeling and the rotational force applied to the rollers by the descending ribbon. In either case, the rollers rotate. Production roller mechanisms typically allow for the rollers to move horizontally and/or vertically from the glass contact area. This accommodates geometric tolerances of the rolls, run-out and tolerance changes in operation, along with normal variability in glass thickness. Further, production roll mechanisms typically allow the rolls to be moved far away from the glass for maintenance access, process restart, and other practical considerations. Frictional forces that resist the free motion of the edge rollers may induce force cycling that manifests as undesirable perturbations or stress changes in the ribbon that can become frozen into the glass as the glass transitions from a viscous material to an elastic material. Another aspect of a production roller mechanism is to minimize air leakage from the draw chamber. An inadequate seal where the shaft of each roller (roll) penetrates the shroud allows excessive flows to exit the shroud—possibly over heating the surrounding equipment—and increases flows of relatively cool gas entering from the shroud bottom. High edge roll seal leakage, especially those which varies over time, can lead to non-optimal cooling of the ribbon and undesirable stress and warp in the final product. Thus, the seal must simultaneously be capable of withstanding the high temperature of the shroud and its interior environment, minimize the egress of hot atmosphere from the shroud interior, and accommodate both displacement of the roller shaft transverse to the shaft longitudinal axis and rotation motion about that axis. Currently, such seals comprise a metal-on-metal interface that introduces friction into the apparatus.

SUMMARY

An apparatus is disclosed for drawing a glass ribbon, and in particular an apparatus having reduced cyclic forces resulting from friction in the drawing apparatus that can manifest as shape or stress within glass sheets cut from the ribbon. A reduction in such force cycling can be achieved by eliminating friction that occurs between moving parts of assemblies that contact the glass ribbon, particularly during the time the glass ribbon is transitioning from a visco-elastic state to an elastic state. This region, known as the setting temperature range, is a temperature range over which the glass has reached a viscosity that stress imparted to the glass can be frozen into the glass. Also disclosed is a method by which a glass ribbon can be drawn from the apparatus.

In one embodiment, an apparatus for drawing a glass ribbon is described comprising a forming body for supplying a glass ribbon, a shroud disposed about the ribbon defining a draw chamber, the shroud comprising a first seal plate and wherein an atmosphere in the draw chamber has a first pressure $P_s$. The apparatus further comprises an edge roll assembly comprising a rotatable shaft extending through the shroud into the draw chamber, a contact surface disposed on the shaft that contacts an edge of the glass ribbon in the draw chamber and a second seal plate coupled to the shaft, there being a gap between the first and second seal plates into which a gas is injected to maintain an atmosphere in the gap at a second pressure $P_g$ equal to or less than the first pressure $P_s$, and wherein the first seal plate includes a slot through which the shaft extends into the draw chamber that allows movement of the shaft transverse to a longitudinal axis of the shaft. The gas is preferably injected into the gap through passages formed in the first seal plate that open at a surface of the first seal plate facing the second seal plate.

The forming body may be, for example, a fusion-style forming body comprising a trough for receiving a molten glass material and converging forming surfaces. The molten glass overflows the trough and flows in separate streams over the converging forming surfaces, then rejoins or fuses at the line along which the converging forming surfaces meet. Alternatively, the forming body may comprise a slot through which a glass ribbon is drawn. In other embodiments the forming body may be a debituse such as used in a Foucault process.

In further embodiments the apparatus may comprise a third seal plate positioned so the shaft passes through an opening in the third seal plate and the second seal plate is arranged between the first and third seal plates. The third seal plate may also comprise gas passages that open at a face of the third seal plate facing the second seal plate through which a gas is injected into a second gap. In certain other embodiments spring members may be positioned between the second and third seal plates. The spring members may be used in conjunction with the gas injected between the second and third seal plates, or in place of the gas injection.

Preferably, the first gap between the first and second seal plates is equal to or less than about 0.254 cm, and a coefficient of friction between the first and second seal plates is <0.4. For example, the first or second seal plate may comprise a layer of graphite or boron nitride or other low friction material having a high heat tolerance.

To further reduce friction in the edge roll assembly, the shaft is supported by a mechanism using air bearings that provide for displacement of the shaft in a direction transverse to the shaft longitudinal axis. The air bearing (or more generically a gas bearing), may be capable of supporting translation or rotation, depending on the design of the edge roll assembly. For example, the shaft may translate in a direction transverse to the longitudinal axis of the shaft, or the shaft may describe an arc, still in a transverse direction.

In still another embodiment, an apparatus for drawing a glass ribbon is disclosed comprising a forming body for supplying a glass ribbon, a shroud disposed about the ribbon defining a draw chamber, wherein an atmosphere in the draw chamber has a first pressure $P_s$ and an edge roll assembly. The edge roll assembly comprises a rotatable shaft extending through the shroud into the draw chamber, a contact surface disposed on the shaft that contacts an edge of the glass ribbon in the draw chamber and a gas bearing coupled to the shaft that allows displacement of the shaft in a direction transverse to a longitudinal axis of the shaft. A seal assembly is also provided comprising a first seal plate affixed to the shroud and a second seal plate coupled to the shaft, there being a gap between the first and second seal plates into which a gas is injected to maintain an atmosphere in the gap at a second pressure $P_g$ equal to or less than the first pressure $P_s$, and wherein the first seal plate includes a slot through which the shaft extends into the draw chamber and wherein the slot accommodates movement of the shaft transverse to the longitudinal axis of the shaft. Either the first or second seal plate, or both, comprises a layer of graphite or boron nitride or other low friction material having a high temperature tolerance. A coefficient of friction between opposing surfaces of the first and second seal plates is preferably <0.4.

In yet another embodiment a method of drawing a glass ribbon is described comprising drawing a glass ribbon from a forming body, the glass ribbon passing through a draw chamber defined by a shroud disposed about the ribbon, wherein the shroud comprises a first seal plate and an atmosphere within the draw chamber has a first pressure $P_s$. The glass ribbon is contacted with an edge roll assembly comprising a rotatable shaft extending into the draw chamber through a passage in the first seal plate that allows movement of the shaft in a direction transverse to a longitudinal axis of the shaft a second seal plate coupled to the shaft so that the second seal plate rotates with the shaft and a contact surface disposed on the shaft that contacts an edge of the glass ribbon. A pressurized gas is injected into a first gap between the first and second seal plates as the second seal plate rotates relative to the first seal plate so that a pressure $P_g$ of an atmosphere in the first gap is equal to or less than $P_s$. A bias force is coupled to the shaft that applies a pressuring force to the shaft in the transverse direction. This generates a pinch force between roll pairs which is required to minimize roll slippage and is a key contributor to tension imparted by the rolls to the glass ribbon. The shaft (and other portions of the edge roll assembly) displace in response to variations in ribbon edge thickness or dimensional variations in the equipment. Friction from the seal plates induces a change to the actual biasing force applied at the shaft-glass interface as the rolls move. Reductions to the seal plate friction allow the rolls to move with minimal variation to the biasing force. Preferably, a coefficient of friction between opposing surfaces of the first and second seal plates is less than 0.4.

Preferably, a maximum frictional force resisting the shaft displacement is less than 2.3 kg so that the contact surface applies a substantially constant force against the glass ribbon during operation. Reduction in friction is also improved by supporting the shaft with a gas bearing.

In certain other embodiments the edge roll assembly may further comprise a third seal plate disposed opposite the first seal plate so the second seal plate rotates between the first and third seal plates. Gas may also be injected into a second gap between the second and third seal plates.

The apparatus further comprises an air bearing supporting the edge roll shaft and a seal assembly comprising a first seal plate affixed to the shroud and a second seal plate affixed to the shaft, there being a gap between the first and second seal plates into which a gas is injected into the gap to maintain an atmosphere in the gap at a second pressure $P_g$ equal to or less than the first pressure $P_s$, and wherein the first seal plate includes an elongated slot through which the shaft extends into the draw chamber and wherein the elongated slot accommodates movement of the shaft transverse to a longitudinal axis of the shaft. Preferably the gap between the first and second seal plates is equal to or less than about 0.254 cm. The slotted first seal plate (or inboard seal plate relative to the glass ribbon) accommodates lateral movement of the edge roll shaft.

The gas may be injected through passages formed in the first seal plate that open at a surface of the first seal plate facing the second seal plate. The injected gas is preferably air, but may be another gas, such as nitrogen or helium or a mixture thereof.

In some embodiments a third seal plate is positioned so that the shaft passes through an opening in the third seal plate and the second seal plate is arranged between the first and third seal plates. The third seal plate comprises gas passages or ports that open at a face of the third seal plate facing the second seal plate. Alternatively, spring members may be positioned between the second and third seal plates.

Any one or a combination of the first, second and/or third seal plates may comprise, for example, a boron nitride coating or a graphite materials or coatings to reduce friction in the event of contact between the seal plates.

In another embodiment, a method of drawing a glass ribbon is disclosed comprising forming a glass ribbon by a drawing process, the glass ribbon passing through a draw chamber defined by a shroud disposed about the ribbon, wherein the shroud comprises a first seal plate and an atmosphere within the draw chamber has a first pressure $P_s$.

The method further comprises contacting the glass ribbon with an edge roll comprising a rotatable shaft extending into the draw chamber through an elongated passage in the first seal plate that accommodates movement of the shaft transverse to a longitudinal axis of the shaft, the shaft including a second seal plate affixed thereto so that the second seal plate rotates with the shaft, and a plane of the second seal plate is perpendicular to the longitudinal axis of the shaft, and a ceramic contact surface disposed on the shaft that contacts an edge of the glass ribbon.

A pressurized gas is injected into a first gap between the first and second seal plates as the second seal plate rotates relative to the first seal plate so that a pressure $P_g$ of an atmosphere in the first gap is equal to or less than $P_s$.

In some embodiments a third seal plate is disposed opposite the first seal plate so that the second seal plate rotates between the first and third seal plates. A gas such as air nitrogen or helium may be injected into a second gap between the second and third seal plates.

The invention will be understood more easily and other objects, characteristics, details and advantages thereof will become more clearly apparent in the course of the following explanatory description, which is given, without in any way implying a limitation, with reference to the attached Figures. It is intended that all such additional systems, methods, features and advantages be included within this description, be within the scope of the present invention, and be protected by the accompanying claims.

DETAILED DESCRIPTION

Figure 1:
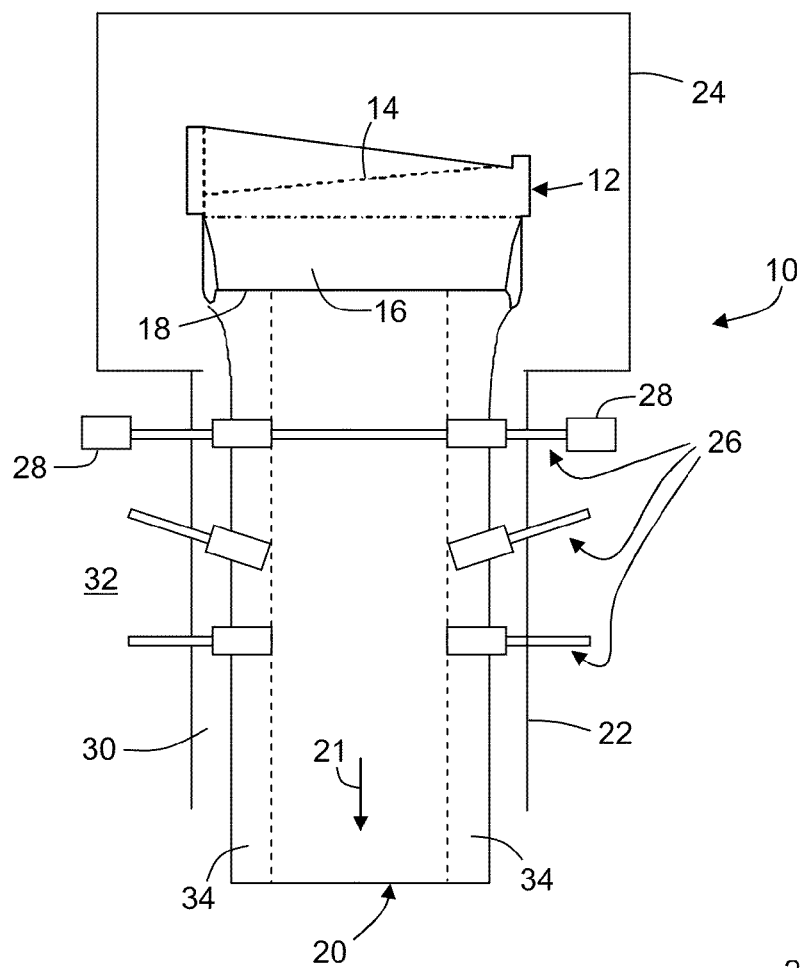
FIG. 1 is a side elevation view of an exemplary fusion downdraw process according to an embodiment of the present invention.

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

Drawing a thin ribbon of material to form a glass sheet having a thickness less than about a millimeter to the exacting standards of flatness required for modern display applications, such as televisions and computer monitors, requires careful control of all aspects of the manufacturing process. However, particular attention must be paid to the period of time during which the glass ribbon is transitioning from viscous state to an elastic state. Even small force variations on the ribbon, such as might be produced by air currents in the drawing area, or vibrations from running equipment, can manifest as perturbations in what should be a pristine, flat surface.

In an exemplary fusion-type downdraw process, molten glass is supplied to a forming body comprising a channel open at its top in an upper surface of the body. The molten glass overflows the walls of the channel and flows down converging outside surfaces of the forming body until the separate flows meet at the line along which the converging surfaces meet (i.e. the "root"). There, the separate flows join, or fuse, to become a single ribbon of glass that flows downward from the forming body. Various rollers (or "rolls") positioned along the edges of the ribbon serve to draw, or pull the ribbon downward and/or apply a tensioning force to the ribbon that helps maintain the width of the ribbon. That is, some rolls may be rotated by motors, whereas other rolls are free-wheeling.

As the ribbon descends from the forming body, the molten material transitions from a viscous state at the bottom of the forming body, to a visco-elastic state and finally to an elastic state. When the ribbon has cooled to an elastic state, the ribbon is scored across its width, and separated along the score line to produce a separate glass sheet.

During the time the ribbon is in a fluid, viscous state, stresses imposed on the molten material are immediately relieved. However, as the ribbon cools and the viscosity increases, induced stresses are not so quickly relieved, until a temperature range is reached when induced stresses will be retained by the glass and ribbon shape can be retained in the glass. Both are sources of undesirable retained stresses and warping of the final product. It is desirable, therefore, that during this period when stress and shape can be frozen into the glass that forces imposed onto the glass ribbon be as consistent as possible. One source of such force variation comes from the edge rolls. Note that force variation from the edge rolls could also result in variability to the glass thickness, and other product attributes. Experience has been that force consistency is important to achieving ultra low stress and high flatness requirements, for example, of LCD substrate sheets.

Although edge rolls may take different forms, in each case a pair of rolls pinches or grips the ribbon. Pairs of rolls are positioned at opposite edges of the ribbon so that for a particular vertical location (i.e. distance from the root) along the length of the ribbon, two pairs of edge rolls are used. Edge rolls may be driven, such as by electric or hydraulic motors, or edge rolls may be free-wheeling. Edge rolls at opposing edges may share a common shaft so that the shafts extends across the width of the ribbon, or each edge roll may have its own, separate shaft that extends only so far as necessary to position the roll contact surface at the distal end of each roll shaft. This contact surface is designed to withstand prolonged high temperatures, sometimes in excess of 800° C., arising from contact with the glass ribbon, and preferably utilizes a ceramic material. Moreover, the shaft or shafts of the edge rolls need not be horizontal (transverse to the direction of draw), but can be tilted with respect to horizontal to increase tension across the width of the ribbon.

Each pair of edge rolls is designed to accommodate a varying gap between the contact surfaces of the rolls. For example, each contact surface may not be perfectly concentric with the shaft to which it is attached, creating run out as the rolls rotate. Further, machining tolerances to shaft straightness and warping at operating temperature contribute to operational run-out. In addition, the rolls are designed to accommodate small fluctuations in the thickness of the ribbon edges. This lateral (horizontal) movement of the edge rolls may occur as the ribbon descends between the roll pairs. In other words, the pulling roll pairs must be able to separate horizontally, and then draw closer together again as the rolls operate. Production edge roll mechanisms are designed to allow for this motion during roll operation, yet to keep a consistent pinch force applied to the glass. Preferably, the rolls are pressured inward, toward the plane of the glass ribbon, by a biasing force. This generates a pinch force between roll pairs which is required to minimize roll slippage and is a key contributor to tension imparted by the rolls to the glass ribbon. The mechanism which applies this biasing force must accommodate inward and outward movement (widening of the gap between the edge roll pair) from the run-out sources described above. For example, the edge rolls may include a lever and fulcrum arrangement that translates the edge roll shaft laterally. Counterweights may be used to apply sufficient force to the lever so the edge roll contact surfaces can grip the glass ribbon, yet still allow the rolls to move transversely to the ribbon plane in response to a varying contact surface eccentricity for example. However, other methods of applying a biasing force can be used, such as springs arranged to either pull or push the roll assembly along a predetermined line of movement. An inherent issue with production rolls systems is that friction within the roll mechanism slides and bearings—along with friction within the seal plates—which resist the motion and imparts an undesired variable force which alters the pinch force applied to the glass. Precise measurements of roll horizontal forces imparted to the ribbon, for example, have shown force variability of over 10 lbs during a roll rotational cycle. Similarly, vertical pulling forces can be affected by this same source.

As the ribbon descends from the forming body, small fluctuations in ribbon edge thickness, or for example eccentricity of the edge roll contact surface, causes movement of the edge roll in a direction transverse to the plane of the glass ribbon. The biasing force maintains contact between the roll contact surface and the glass ribbon edge. However, friction in the system opposes these motions. In the extreme, such as if the pulling roll pair was frozen in place and capable only of rotation of the roll contact surface, changes in the system would be acutely felt by the ribbon. For example, if one or both contact surfaces were not concentric with their respective shafts, each revolution of the contact surface would apply a cyclic force against the ribbon. This cyclic force would have a direct impact on the stress in the ribbon that varied with time. Thus, reducing frictional forces in the edge roll assemblies works to reduce stress variations in the ribbon that can impact the shape (e.g. flatness) of glass sheets separated from the ribbon.

Shown in FIG. 1 is an exemplary fusion downdraw apparatus 10 comprising forming body 12 including channel or trough 14 and converging forming surfaces 16. Converging forming surfaces 16 meet at root 18. Trough 14 is supplied from a source (not shown) with molten glass that overflows the walls of the trough and descends over the outer surfaces of the forming body as separate streams. The separate streams of molten glass flowing over converging forming surfaces 16 meet at root 18 and form glass ribbon 20 that flows downward in direction 21.

When glass ribbon 20 has reached a final thickness and viscosity, the ribbon is separated across its width to provide an independent glass sheet or pane. As molten glass continues to be supplied to the forming body, and the ribbon lengthens, additional glass sheets are separated from the ribbon.

Shroud 22 surrounds the upper reaches of ribbon 20 below root 18 and connects with an upper enclosure 24 that houses forming body 12. Shroud 22 serves as a platform on which various heating and/or cooling equipment may be positioned to regulate the temperature of the ribbon. However, due to the buoyancy of the hotter air in the interior of the shroud—along with the hottest temperatures being in the uppermost extent of the shroud, the interior pressure rises over the height of the shroud. Openings and leaks in the shroud 22 walls result in upward internal air flow from the shroud's base and typically have significant impact on thermal conditions within the shroud Excessive leakage can exceed the capability of the heating equipment to meet optimal ribbon temperatures and lead to stress and warp in the final product. Changes in air leakage result in general and/or local changes in the shroud cooling rate, which in turn, can lead to stress or warp in the final product. For successful production sheet drawing, it is important that openings and leaks be minimized and stay consistent over time.

Edge roll assemblies 26 are positioned at predetermined vertical locations below root 18, and may include driven edge rolls used to apply a pulling force to the ribbon and/or non-driven idler rolls that guide the ribbon and help maintain a tension across the ribbon width. As described above, rolls may share a common shaft which spans the ribbon width, or each roll may have its own shaft. Edge rolls are typically arranged in pairs, each roll of a roll pair positioned on opposite sides of an edge of the ribbon. Additionally, edge roll pairs are themselves arranged in pairs, one pair of rolls per ribbon edge at a given vertical position.

Edge roll assemblies, including their operative structures, are governed by typical manufacturing tolerances. For example, edge roll contact surfaces that contact ribbon edge portions 34 may not be exactly concentric with a respective shaft. Or, an edge roll contact surface may be out of round (e.g. include a local flatness). Or the edge roll shaft may be not perfectly straight, either when built or during operation. These factors may lead to a periodic lateral displacement of an edge roll, and, like an out-of-round tire, may result in a periodic motion each time the rolls completes a revolution. In addition, the ribbon edges (or "beads") are slightly bulbous, and their thickness may vary along the length of the ribbon. In other words, the edge rolls of an edge roll pair should accommodate a varying gap between them.

Ideally, the roll mechanism is designed to accommodate the operating movement of the edge rolls—and yet maintain a consistent pinch force between the roll pairs. However, in practice, friction within the seal plates and mechanism causes the pinch force to vary. This, in turn, causes the horizontal and vertical components of the roll forces imparted onto the glass ribbon to vary. This cycling of the roll forces can directly impact the product as stress or its variability, warp or its variability, or even as variation to the glass thickness.

Figure 2:
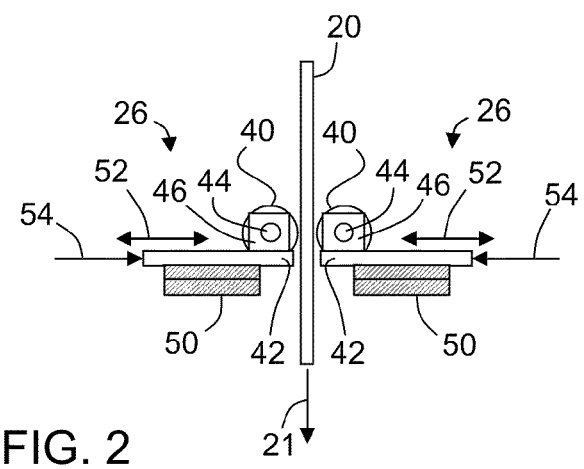
FIG. 2 is an edge view relative to the glass ribbon showing a pair of edge roll assemblies engaged with the glass ribbon.

Shown in FIG. 2 is a view of a portion of the apparatus of FIG. 1 seen looking toward one edge portion 34 of glass ribbon 20. A pair of opposed edge roll assemblies 26 are depicted, each edge roll assembly comprising a roll contact surface 40 coupled to edge roll support 42 through roll shaft 44 and shaft bearing assembly 46. Contact surfaces 40 may contact the ribbon at any vertical location of the ribbon, including the viscous, visco-elastic or elastic portions, depending on the function of the edge roll.

Figure 4A:
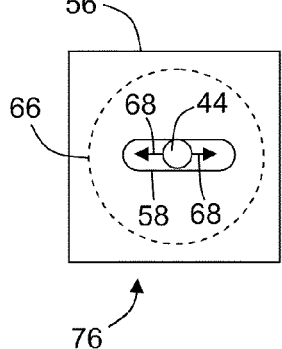
FIG. 4A is a side view of the seal plate of FIG. 3 comprising a linear slot to accommodate the roll shaft.
Figure 4B:
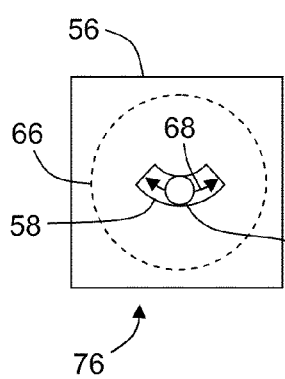
FIG. 4B is a side view of the seal plate of FIG. 3 comprising an arcuate slot to accommodate the roll shaft.
Figure 4C:
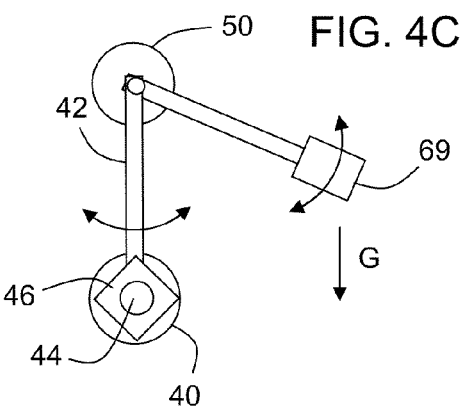
FIG. 4C is a side view of an exemplary edge roll assembly comprising a counterweight and arranged to displace the roll shaft through an arc.

Edge roll support member 42 is in turn coupled to bearing 50. Bearing 50 is preferably a low friction bearing, and is preferably an air bearing such as a linear air slide or a rotary air bearing. Edge roll support 42 therefore facilitates low friction movement of edge roll support member 42 in a direction transverse to a vertical plane passing through root 18, such as indicated by arrow 52. A bias force, such as bias force 54 shown in FIG. 2, is applied against edge roll support 42 and, in combination with an opposing edge roll assembly, operates to pinch the glass ribbon between the edge roll pair contact surfaces 40. It should be noted that movement of each edge roll support need not be a simple translation along direction 52. For example, each edge roll assembly may be configured to swing about an axis so that an edge roll contact surface arcs away from the ribbon (FIG. 4C). In this instance, the bearing supporting support 42 is designed to accommodate movement through partial rotation rather than linear translation through the action of counterweight 69 and gravity G.

Figure 3:
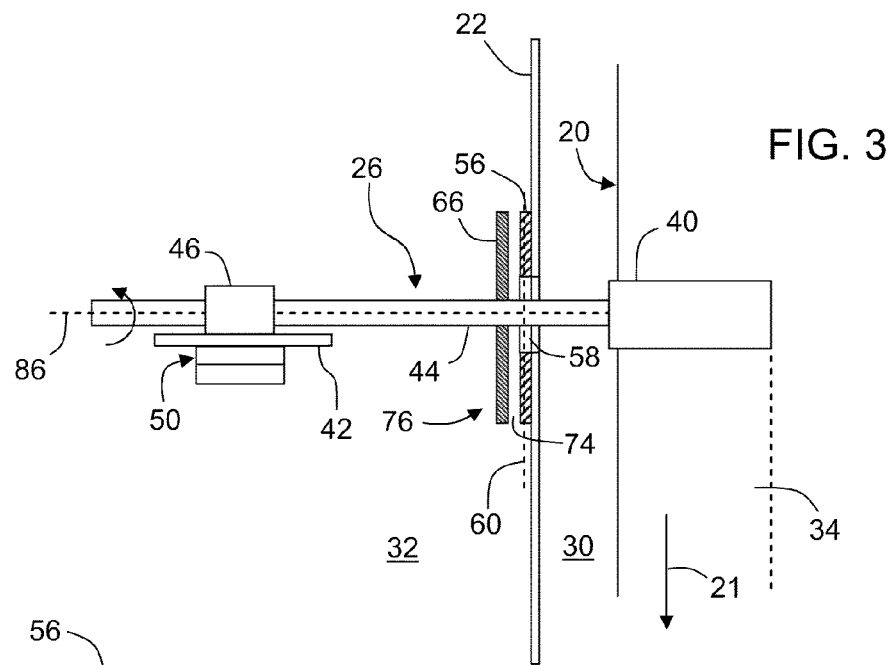
FIG. 3 is a cross sectional side view of an edge roll and seal assembly according to an embodiment of the present invention

FIG. 3 depicts a portion of shroud 22 and glass ribbon 20, including ribbon edge portion 34. Shroud 22 includes a stationary first seal plate 56. Although first seal plate 56 is illustrated as a separate plate, first seal plate 56 could simply be a portion of the shroud itself. First seal plate 56 defines an opening 58 that extends through the thickness of the first seal plate and is elongated in a plane 60 of the plate (see FIGS. 4A and 4B).

Because the environment within the internal space defined by the shroud is at a high temperature (e.g. 600° C.-900° C.) relative to the region outside the shroud (e.g. less than about 125° C.), every effort is made to retain as much of the edge rolls external to the shroud as possible, such as, for example, the driving force used on driven rolls (e.g. electric or hydraulic motors 28) or the edge roll mechanical positioning equipment. However, this requires that the edge roll assemblies, and in particular the edge roll shafts, penetrate the shroud at their respective locations. Without mitigation, this penetration creates an opening that can allow an exchange of gas between the shroud inside atmosphere 30 and the atmosphere 32 outside the shroud. Generally, because of the buoyancy effect of the hot interior, the pressure of atmosphere 30 increases with the shroud height. Opening sizes and external pressures are carefully controlled—since openings higher in the shroud will generally increase airflow from the base— disrupting the internal thermal environment. Thus, to prevent egress of the hotter external gas, it would be highly beneficial for each shaft penetration to be sealed in a manner that maintains an equal or slightly positive pressure of the internal atmosphere (relative to the external atmosphere) and still allow both rotational and lateral movement of the edge roll shafts. Typically, the atmosphere inside and outside the shroud is air.

Accordingly, shaft 44 is supported by bearing assembly 46, and includes a second seal plate 66 affixed to the shaft so that second seal plate 66 rotates with shaft 44. The elongation of opening 58 is designed to accommodate lateral movement of shaft 44 (represented by arrows 68—see FIG. 4A). However, opening 58 need not be linear (straight), but may include some curvature (FIG. 4B), as in some embodiments lateral movement of the shaft may include a rotational component.

Figure 5:
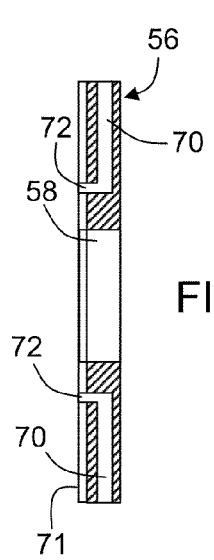
FIG. 5 is a cross sectional edge view of a seal assembly showing gas passages for delivering a gas to a face of the seal plate.

As illustrated in FIG. 5, first seal plate 56 preferably also includes passages 70 that receive a pressurized gas from a gas source (not shown). The supplied pressurized gas travels through passages 70 and exits first seal plate 56 through orifices 72 formed in a face of first seal plate 56. Orifices 72 are arranged facing second seal plate 66 so that a pressure in gap 74 ($P_g$) between the first and second seal plates 56, 66 can be regulated to be equal to or less than the pressure $P_s$ of atmosphere 30 enclosed by the shroud. Gap 74 is preferably equal to or less than about 0.254 cm, more preferably equal to or less than about 0.127 cm, so that as second seal plate 66 rotates with shaft 44, the first and second seal plates preferably do not touch.

First and second seal plates 56, 66 comprise seal assembly 76 that prevents the egress of hotter atmosphere from the shroud. In addition, the design of seal assembly 76 minimizes frictional forces that might come into play if first and second seal plates 56, 66 contact and produce frictional forces that impede movement of shaft 44. For this reason, one or both of seal plates 56, 66 preferably comprise boron nitride, or other low friction material (e.g. graphite), in case contact occurs. Steel to steel and steel to iron frictional coefficients typically measure in the range of about 0.4 -0.8. On the other hand, graphite to steel, or boron nitride to steel frictional coefficients are typically $\leq 0.1$. Such low friction material can be, for example, a coating or layer 71 on potentially contacting surfaces of either or both of the first or second seal plates.

Figure 6:
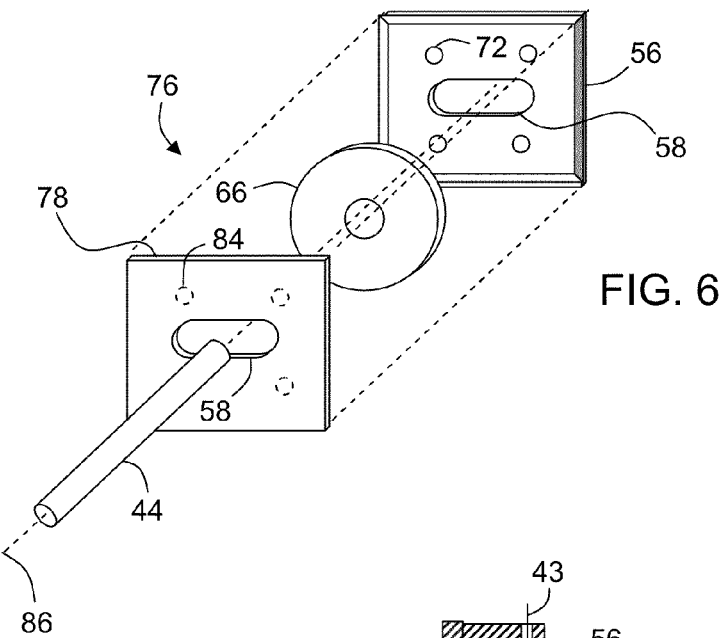
FIG. 6 is an exploded view of another embodiment of a seal assembly according to an embodiment of the present invention comprising three seal plates.
Figure 8:
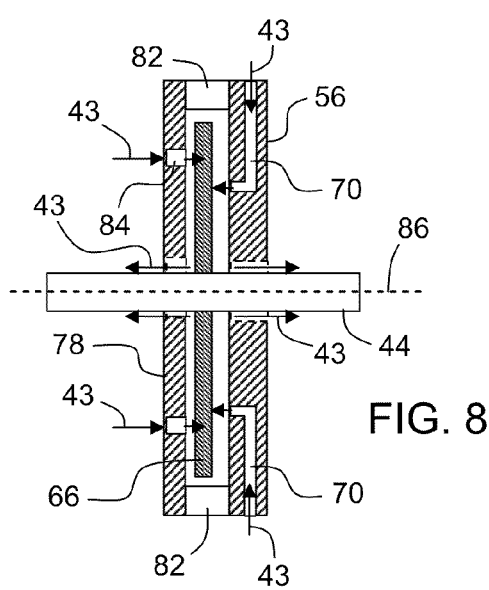
FIG. 8 is a cross sectional edge view of a variation of the seal assembly of FIG. 7 using spacer members between several seal plates.
Figure 7:
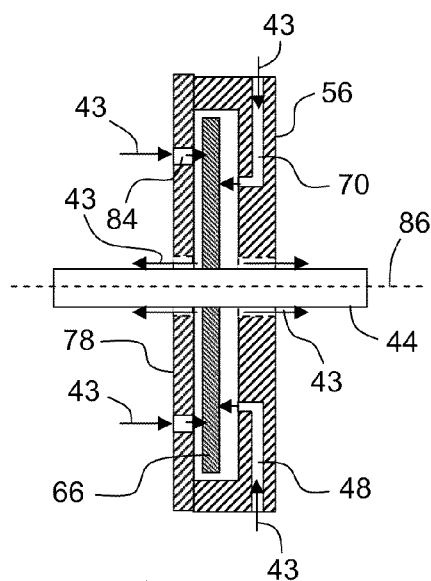
FIG. 7 is a cross sectional edge view of the seal assembly of FIG. 6 showing gas passages and gas flow.

FIG. 6 depicts an exploded view of another embodiment wherein seal assembly 76 includes third seal plate 78. In accordance with the present embodiment, first seal plate 56 and third seal plate 78 form a box arrangement, with second seal plate 66 confined between first and third seal plates 56, 78. Although FIG. 6 and FIG. 7 depict first seal plate 56 as having "L" shaped edges to provide the spacing necessary to accommodate second seal plate 66, this function could be easily achieved with seal plate 78 while maintaining first seal plate 56 flat, or including spacer member 82 between flat first and third seal plates 56, 78 (see FIG. 8). Similar to first seal plate 56, third seal plate 78 includes an elongated passage 58 to accommodate lateral movement of shaft 44 passing therethrough. Additionally, third seal plate 78 may include gas ports 84 that are supplied with a pressurized gas and arranged to face second seal plate 66. Gas flow is shown by arrows 43.

In addition to providing a regulating pressure to gap 74 between first and second seal plates 56, 66, the pressured gas supplied to the passages of first and third seal plates 56, 78 can also served to produce a gas cushion between the first and third seal plates and the second seal plate that minimizes the possibility of contact between the seal plates. Such contact might occur, for example, due to motion of shaft 44 along shaft longitudinal axis 86. The gas supplied to third seal plate 78 can also serve as a counter force to the pressure applied against second seal plate 66 by the gas issuing from first seal plate 56.

Figure 9:
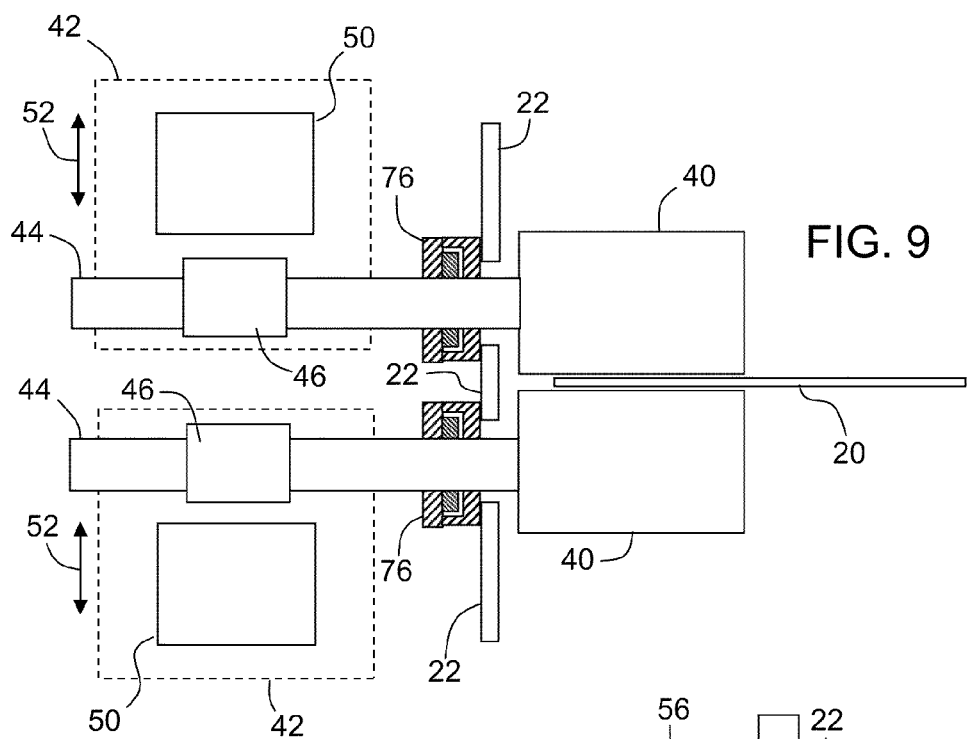
FIG. 9 is a top cross sectional view showing a pair of edge rolls engaged with an edge of a glass ribbon, further illustrating air bearings coupled with the edge roll shafts via support members and employing seal assemblies.

FIG. 9 illustrates a top cross sectional view of a pair of edge roll assemblies 26 arranged so that their respective contact surfaces 40 pinch the edge of the glass ribbon between them. Also shown are respective seal assemblies 76.

In another embodiment, depicted in FIG. 9, a counter force to the force applied by the gas issuing from first seal plate 56 can be provided by springs 86 positioned within the gap 88 between second and third seal plates 66, 78. However, this is less preferred because the contact between the springs and the seal plates, although less than what would be present between the two seal plates if allowed to ride against each other, still produces friction that can be manifest in the glass ribbon.

Figure 10:
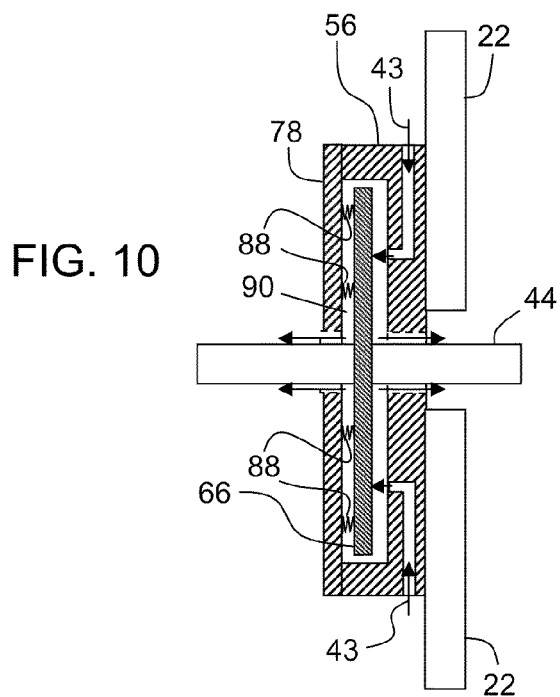
FIG. 10 is a cross sectional view of another embodiment of a seal assembly utilizing springs between several seal plates.

In another embodiment, depicted in FIG. 10, a counter force to the force applied by the gas issuing from first seal plate 56 can be provided by springs 88 positioned within the gap 90 between second and third seal plates 66, 78. However, this is less preferred because the contact between the springs and the seal plates, although less than what would be present between the two seal plates if allowed to ride against each other, still produces friction that can be manifest in the glass ribbon.

What is claimed is:

1. An apparatus for drawing a glass ribbon comprising:
    a forming body for supplying a glass ribbon;
    a shroud disposed about the ribbon defining a draw chamber, the shroud comprising a first seal plate and wherein an atmosphere in the draw chamber has a first pressure $P_s$;
    an edge roll assembly comprising:
        a rotatable shaft extending through the shroud into the draw chamber;
        a contact surface disposed on the shaft that contacts an edge of the glass ribbon in the draw chamber; and
        a second seal plate coupled to the shaft, there being a gap between the first and second seal plates, wherein passages are formed in the first seal plate into which a gas is injected to maintain an atmosphere in the gap at a second pressure $P_g$ equal to or less than the first pressure $P_s$, and wherein the first seal plate includes a slot through which the shaft extends into the draw chamber that allows movement of the shaft transverse to a longitudinal axis of the shaft.

2. The apparatus according to claim 1, wherein the gas is injected through passages formed in the first seal plate that open at a surface of the first seal plate facing the second seal plate.

3. The apparatus according to claim 1, further comprising a third seal plate positioned so the shaft passes through an opening in the third seal plate and the second seal plate is arranged between the first and third seal plates.

4. The apparatus according to claim 3, wherein the third seal plate comprises gas passages that open at a face of the third seal plate facing the second seal plate through which the gas is injected.

5. The apparatus according to claim 3, further comprising spring members positioned between the second and third seal plates.

6. The apparatus according to claim 1, wherein the gap between the first and second seal plates is equal to or less than about 0.254 cm.

7. The apparatus according to claim 1, wherein the first or second seal plate comprises a coefficient of friction <0.4.

8. The apparatus according to claim 1, wherein the first or second seal plate comprises a layer of graphite or boron nitride.

9. The apparatus according to claim 1, wherein the shaft is coupled to an air bearing that provides for displacement of the shaft in a direction transverse to the shaft longitudinal axis.

10. An apparatus for drawing a glass ribbon comprising:
a forming body for supplying a glass ribbon;
a shroud disposed about the ribbon defining a draw chamber, wherein an atmosphere in the draw chamber has a first pressure $P_s$;
an edge roll assembly comprising:
a rotatable shaft extending through the shroud into the draw chamber;
a contact surface disposed on the shaft that contacts an edge of the glass ribbon in the draw chamber;
an air bearing coupled to the shaft that allows displacement of the shaft in a direction transverse to a longitudinal axis of the shaft; and
a seal assembly comprising a first seal plate affixed to the shroud and a second seal plate coupled to the shaft, there being a gap between the first and second seal plates, wherein passages are formed in the first seal plate into which a gas is injected to maintain an atmosphere in the gap at a second pressure $P_g$ equal to or less than the first pressure $P_s$, and wherein the first seal plate includes a slot through which the shaft extends into the draw chamber and wherein the slot accommodates movement of the shaft transverse to the longitudinal axis of the shaft.

11. The apparatus according to claim 10, wherein the first or second seal plate comprises a layer of graphite or boron nitride.

12. The apparatus according to claim 10, wherein a coefficient of friction between opposing surfaces of the first and second seal plates is <0.4.

13. The apparatus according to claim 10, wherein the shaft is coupled to a gas bearing.

* * * * *